UNITED STATES PATENT OFFICE.

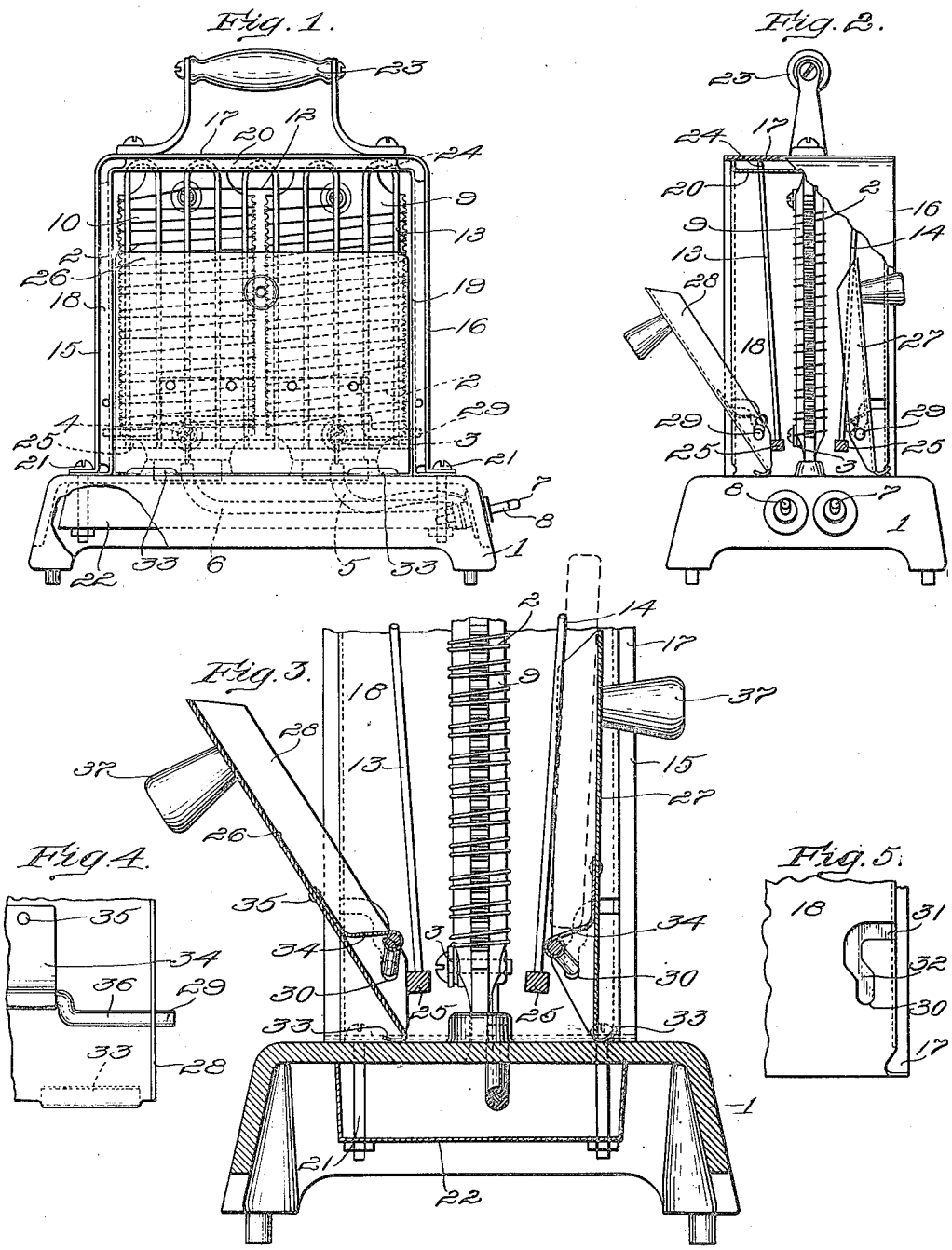

JAMES I. AYER, OF CAMBRIDGE, MASSACHUSETTS, ASSIGNOR TO SIMPLEX ELECTRIC HEATING COMPANY, OF BOSTON, MASSACHUSETTS, A CORPORATION OF MASSACHUSETTS.

ELECTRIC TOASTER.

951,765.  Specification of Letters Patent.  Patented Mar. 8, 1910.

Application filed October 26, 1909. Serial No. 524,637.

*To all whom it may concern:*

Be it known that I, JAMES I. AYER, a citizen of the United States, and resident of Cambridge, in the county of Middlesex and State of Massachusetts, have invented an Improvement in Electric Toasters, of which the following description, in connection with the accompanying drawings, is a specification, like numerals on the drawings representing like parts.

My invention is an electric toaster, for toasting bread and the like.

I have found that by inclosing the heating element against the free passage of air currents so that the heat is kept in rather than disseminated, the apparatus is enabled to attain great efficiency. By this means, the heat is kept in, so as to dry and toast the bread to the best advantage, and the effect of the radiation of the reflecting inclosing surfaces is added to the ordinary radiation of the heating element, and extraneous air currents are cut off.

In carrying out my invention, I provide the heat in any well known manner, as by an upright heating unit protected on its opposite sides by wires or grids, and this heat unit is inclosed by relatively wide end walls and overhanging top, forming an inclosing casing, preferably having double walls to provide an air space or heat insulation so as to aid still further in preventing heat loss, and inclose the opposite sides with doors substantially tight and adapted to swing downwardly and outwardly for receiving the slices of bread to be toasted, ana then closing upwardly and inwardly so as to hold the bread against the protecting grids or screens and close against the inclosing ends and bottom of the toaster so as to cut off air currents and hold in the heat, said doors terminating somewhat short of the top so as to leave a space for the necessary escape of steam or moisture as it is driven off from the bread. Preferably the inclosing walls and doors have inner reflecting surfaces which reflect back the heat, the reflecting inner surfaces of the doors being of material aid in helping the apparatus to heat up at the beginning in order to get ready for the toasting operation. Preferably the doors are removable to permit the ready cleaning of the inside of the apparatus.

A further feature of my invention resides in providing a construction whereby the doors tend automatically to keep closed. Each door is provided on its inner side with a sloping shelf or rest which automatically projects the bread directly against the adjacent grid or screen in proper position for toasting.

The constructional details and further advantages of my invention will be pointed out more at length in the course of the following description, taken with reference to the accompanying drawings, in which I have shown a preferred embodiment of the invention.

In the drawings, Figure 1 is a view in front elevation, partly broken away, showing a complete embodiment of the toaster; Fig. 2 shows the same in end elevation, the adjacent end being partly broken out to show the internal construction; Fig. 3 is an enlarged transverse sectional view of the lower portion of the apparatus for more clearly exhibiting the door construction; Fig. 4 is a fragmentary view of the hinge portion of one of the doors viewed from the inside; and Fig. 5 shows in front elevation the coöperating slot portion for the hinge of the door.

On a suitable base 1 is centrally mounted the heat-supplying element and protecting grid, which may be of any well known kind, being herein shown as comprising a single heating unit of conductor wire 2 connected at its opposite ends at 3, 4 to supply conductors 5, 6 terminating in usual connectors 7, 8. The resistance wire 2 is wound in usual manner around any convenient kind of support or supports, herein shown as clay uprights 9, 10, the middle portion of said wire extending across at 12 to complete the circuit of said unit. In front of this heating unit the screens or grids are shown as composed of vertical wires or rods 13, 14.

All the mechanism above described is well known in this art.

Inclosing the heating element is a U-shaped heat convector comprising wide vertical ends 15, 16, and a top 17 within which is a substantially coextensive auxiliary wall-member 18, 19, 20, provided with an inner reflecting surface and spaced from the main inclosure 15—17 sufficiently to provide a dead air space or heat insulator. The main inclosing device and the inner reflecting member are secured rigidly in position by bolts 21 passed through their upturned ends and through a pan-like protector 22 on the under side of the base 1 for protecting and concealing the conductors 5, 6. To the top of the inclosing device is secured a handle 23 by which the apparatus can be conveniently carried. The upper ends of the rods 13 and 14 preferably diverge slightly so as to make the grids oblique as clearly shown in Fig. 2, and are held at their upper ends by being passed through the wall member 20 as clearly shown in Figs. 1 and 2 at 24 and are secured at their lower ends in transverse bars 25.

At the opposite sides of the apparatus are doors 26, 27, which constitute one of the features of my invention, said doors extending down close to the top surface of the base 1 and preferably having their end edges turned inwardly as indicated at 28, said doors preferably terminating somewhat short of the top so as to leave a space for the necessary escape of steam or moisture as it is driven off from the bread. These doors have pivot ends 29 extending at each end to fit loosely in the lower end 30 of grooves or slots formed therefor in the adjacent inclosing member. These slots extend upwardly from said lower end 30 and outwardly at 31 so as to permit the doors to be readily removed and replaced, said slots having an offset 32 to prevent the too easy removal of the door, and to tend to hold the same in its operative position at the lower end 30 and against unintentional removal. At its lower edge the door is provided, below its pivots, with outwardly extending lips 33 which serve to give the doors a free sliding opening movement when it is desired to open the doors, and to hold the doors closed when tipped into closed position. The weight of the doors is transmitted by these lips 33 to the base 1, and as the lips engage the base outside of the vertical line of the door when the latter is closed, i. e. outside of the plane of the door, they brace the door closed. On its lower side, and preferably just above the pivot, the door is provided with a sloping shelf or bread rest 34 secured to the door at 35 and preferably supported at its lower end by a raised transversely extending portion 36 of the same wire whose ends constitute the pivots or hinging portion 29 of the door. This rest or shelf also aids in holding the door tightly closed when a piece of bread is in place, inasmuch as it brings the weight of the bread to the inside of the vertical line from the point of support of the door at 33. Also, as the shelf is sloping, the bread slides downwardly thereon toward the adjacent grid, as shown at the right of Fig. 3. The doors are provided with handles 37 of wood or other poor heat conductor so that they may readily be opened and closed when desired.

When it is desired to use the apparatus, the current is turned on, the doors having first been closed, and the apparatus very quickly heats up inasmuch as the doors hold the heat in, and reflect the heat back on the turns of heating wire, the wide inclosing walls at the ends and top of the apparatus also coöperating to the same end. Thereupon the door is swung open as shown at the left, Figs. 2 and 3, a piece of bread is placed on the shelf 34, and the door is closed to the position shown at the right of Fig. 3. As the door is a substantially close fit at the sides and bottom and is composed of sheet material, i. e. non-foraminous or not openwork, it coöperates with the closed ends and top of the inclosing member in applying the utmost heat directly to the bread which is being toasted. The heat is not only kept in, but the radiation of the reflecting surfaces at the ends and top of the apparatus aid in securing the utmost efficiency. The air currents which would otherwise take place are cut off, the air current being restricted solely to that amount which is necessary to carry off the steam or vapor from the bread, which passes out over the top of the door. After the apparatus has been used, more or less crumbs will fall beneath the heating element, and these are very quickly and conveniently removed and the apparatus otherwise cleaned by first removing the door, which is accomplished simply by pulling upwardly and outwardly on the door, whereby it is unhinged or removed from the slots, thereby exposing all the interior mechanism for such attention as may be required.

Having described my invention, what I claim as new and desire to secure by Letters Patent is:

1. In an electric toaster, the combination with a substantially vertical electric heating element, and a permanent inclosure for the opposite ends and top thereof, the heating element having an open, flat outer side, of movable closing means for substantially closing in the open, flat outer side of said heating element during the toasting operation, said means being movable sidewise toward and from the adjacent exposed flat toasting side of said heating element in a direction transversely of said side and being capable of substantially cutting off outside air currents from the material being toasted.

2. In an electric toaster, the combination with a substantially vertical electric heating means, of an inverted U-shaped means for keeping in the heat, extending permanently across the ends and top of said heating means, and a closing door pivotally mounted adjacent the bottom of said inclosure lengthwise of the heating means and adapted to turn inwardly into closing position with relation to said heating means lengthwise against the flat side of the material being toasted.

3. In an electric toaster, the combination with a substantially vertical electric heating means, of an inverted U-shaped means for keeping in the heat, extending across the ends and top of said heating means, said inclosing means having an inner reflecting surface for reflecting the heat back onto the heating means, and a closing door of sheet material pivotally mounted adjacent the bottom of said inclosure and adapted to turn inwardly into closing position with relation to said heating means, said door terminating short of the top of said inclosing means to provide an outlet for the escape of steam from the substance being toasted.

4. In an electric toaster, the combination with a substantially vertical electric heating means, of an inverted U-shaped means for keeping in the heat, extending across the ends and top of said heating means, said inclosing means having double walls with an intervening heat insulator for aiding in retaining the heat within the apparatus, and a closing door of sheet material pivotally mounted adjacent the bottom of said inclosure and adapted to turn inwardly into closing position with relation to said heating means, said door terminating short of the top of said inclosing means to provide an outlet for the escape of steam from the substance being toasted.

5. In an electric toaster, the combination with a substantially vertical electric heating means, of an inverted U-shaped means for keeping in the heat, extending across the ends and the top of said heating means, and a closing door of sheet material pivotally mounted adjacent the bottom of said inclosure and adapted to turn inwardly into closing position with relation to said heating means, said door terminating short of the top of said inclosing means to provide an outlet for the escape of steam from the substance being toasted, said inclosing means and door having heat-reflecting inner surfaces for directing the heat back onto the heating means.

6. In an electric toaster, the combination with a substantially vertical electric heating means, and a supporting grid for limiting the approach thereto of the article to be toasted, of a horizontally hinged removable supporting door for holding said article in position to be toasted, said door being removable to facilitate the cleaning of the apparatus.

7. In an electric toaster, the combination with a substantially vertical electric heating means, and a supporting grid for limiting the approach thereto of the article to be toasted, of a horizontally hinged supporting door having on its inner side adjacent the bottom thereof an inwardly extending supporting shelf for sustaining said article in toasting position.

8. In an electric toaster, the combination with a substantially vertical electric heating means, and a supporting grid for limiting the approach thereto of the article to be toasted, of a horizontally hinged supporting door having on its inner side adjacent the bottom a shelf extending inwardly and downwardly for supporting said article and causing the same to tend to slide toward said grid.

9. In an electric toaster, the combination with a central, substantially vertical heating element whose opposite flat, toasting sides are open, of opposite sheet-like doors for closing in said sides, said doors being movable into approximately vertical position flatwise in front of and parallel to said exposed sides respectively for retaining the heat and also the material being toasted.

10. In an electric toaster, the combination with a central, substantially vertical heating element, and a closed horizontal base for supporting said element, said heating element having opposite open and exposed flat, toasting sides, of opposite sheet-like doors horizontally hinged lengthwise of said sides of the heating element to turn into approximately vertical position parallel to said sides of the heating element and into substantially closed relation with said base to cut off the upward flow of air currents to the material held between the doors and the heating element while being toasted.

11. In an electric toaster, the combination with an approximately vertical electric heating element, and a base for supporting the same, of a horizontally hinged door resting on said base and arranged to swing into approximately vertical toasting position with relation to said heating element, said door having at its lower edge means engaging said base in position to brace said door closed when in said toasting position.

12. In an electric toaster, the combination with an approximately vertical electric heating element, and a base for supporting the same, of a horizontally hinged door resting on said base and arranged to swing into approximately vertical toasting position with relation to said heating element, said door having at its lower edge below said pivots outturned lips arranged to bear on said base outside of the plane of the door for maintaining the door in its closed position.

13. In an electric toaster, the combination with an approximately vertical electric heating element, and a base for supporting the same, of a horizontally hinged door resting on said base and arranged to swing into approximately vertical toasting position with relation to said heating element, said door having at its lower edge below said pivots outturned lips arranged to bear on said base outside of the plane of the door for maintaining the door in its closed position, said lips projecting forward sufficiently to maintain the door also in its open position.

14. In an electric toaster, the combination with a substantially vertical electric heating means, of an inverted U-shaped means for keeping in the heat, extending across the ends and top of said heating means, and a closing door of sheet material pivotally mounted adjacent the bottom of said inclosure and adapted to turn inwardly into closing position with relation to said heating means.

In testimony whereof, I have signed my name to this specification, in the presence of two subscribing witnesses.

JAS. I. AYER.

Witnesses:
ALBERT F. AMEE,
GERTRUDE ARKERSON.